United States Patent [19]
Fischer

[11] 4,083,357
[45] Apr. 11, 1978

[54] SOLAR COOKER

[76] Inventor: Lawrence Fischer, 302 Center St., Redwood City, Calif. 94061

[21] Appl. No.: 715,905

[22] Filed: Aug. 19, 1976

[51] Int. Cl.² .................................................. F24J 3/02
[52] U.S. Cl. .................................................. 126/270
[58] Field of Search .................................... 126/270

[56] References Cited

U.S. PATENT DOCUMENTS

| 2,859,745 | 11/1958 | Von Brudersdorff | 126/270 |
| 2,945,417 | 7/1960 | Caryl et al. | 126/270 |
| 2,994,318 | 8/1961 | Lee | 126/270 |
| 2,998,002 | 8/1961 | Standig | 126/270 |
| 3,053,248 | 9/1962 | Daymon | 126/270 |
| 3,236,227 | 2/1966 | Steinberg | 126/270 |
| 3,391,688 | 7/1968 | Dery | 126/270 |
| 3,938,497 | 2/1976 | Andrassy | 126/270 |
| 3,990,914 | 11/1976 | Weinstein et al. | 126/270 |
| 4,023,555 | 5/1977 | Bailey | 126/270 |

OTHER PUBLICATIONS

*Practical Sun Power*, Lorien House, Black Mountain, N. Carolina, pp. 6 & 7, "5 Projects to Help Free You From Depending on Any Fuel Other Than the Sun".

*Primary Examiner*—Lloyd L. King

[57] ABSTRACT

A solar heating device for the cooking of food, consisting of a parabolic trough reflector and having support legs attached at the approximate center of gravity of the reflector and oven assembly. The reflector longitudinal supports serving to hold a cooking oven consisting of a bottom of transparent plastic and a detachable top made of insulation and lined inside with a reflective material. The items to be cooked are supported inside the oven by means of a skewer or a skewer supported pan. The reflector assembly also having an aiming device mounted on it's perpendicular support to assure reflector focus by means of shadows.

5 Claims, 4 Drawing Figures

SOLAR COOKER

This invention relates to a solar cooker that can be easily adjusted to track the sun, requires no skill to focus, is not greatly affected by the wind, and has easy access to the food being cooked. Present solar cookers use the paraboloidal dish as a reflector and have no means of supporting the reflector and cooking container in a near balance condition so the cooker can be easily secured in focus. This invention uses the parabolic cylinder reflector and is so mounted to provide a pivot point for the cooker near it's center of gravity so that the focus may be held by a light friction device. The invention is provided with a sliding friction lock so it can be locked in the proper position and not be affected by the wind. Also provided is an aiming device mounted on the cooker support that uses shadows to show proper focus of the solar cooker. Also provided is a cylindrical shaped cooking container or oven with a transparent plastic bottom to transmit the sun's rays through the bottom to the food to be cooked. The top of the cooking oven is an insulated cover lined inside with a reflective material to conserve the heat. Also provided is a means of quickly attaching or detaching the cooker legs for portability and a means of folding together the two leg assemblies. Also provided is a skewer mount and a skewer to support the food directly or support a pan to hold liquid food. The pan being free to rotate on the skewer and suspended below the skewer so it is automatically upright in any cooker position.

Figure 1:
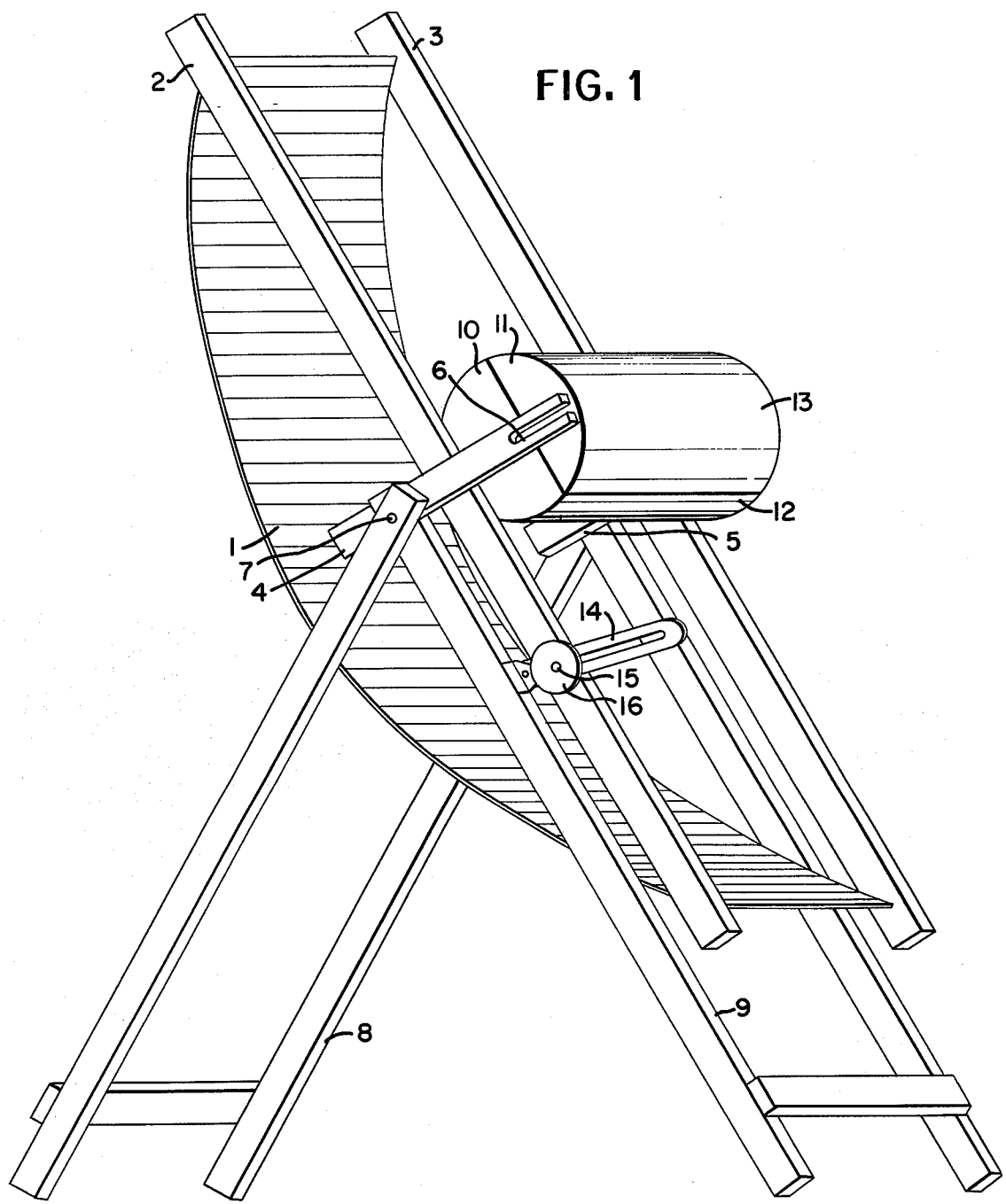
FIG. 1 is a perspective view of the solar cooker in it's operating position for a low sun angle.

Referring to FIG. 1, the parabolic trough reflector 1 is comprised of a plurality of glass mirror segments and is mounted to the longitudinal supports 2, 3. The longitudinal supports 2, 3 are secured to the perpendicular supports 4, 5. Each of the perpendicular supports 4, 5 has a slot 6 cut in one end and a hole 7 drilled in the other end.

The folding leg assemblies 8, 9 each have holes 7 drilled in their upper ends. The leg assemblies 8, 9 and the perpendicular supports 5, 6 are pinned together through the hole 7 in such a manner to allow the parabolic trough reflector 1, longitudinal supports 2, 3 and perpendicular supports 5, 6 to rotate around the pin in hole 7 and be supported on the leg assemblies 8, 9. The pin in hole 7 also allows the leg assemblies 8, 9 to be folded together when not supporting the parabolic trough reflector assembly 1, 2, 3, 4, 5.

Secured to the longitudinal supports 2, 3 is a cylindrical oven assembly 10, 11, 12, 13 consisting of two round, flat ends cut into two pieces 10, 11 each, and a transparent plastic cylindrical bottom section 12 and an insulating cylindrical top section 13.

Mounted on the leg assembly 9 is a pivoting, sliding lock 14 which has a long slot cut in it, which engages a threaded stud 15 mounted on the longitudinal support 2. The sliding lock 14 is secured in the desired position, to the longitudinal support 2 by means of a threaded knob 16 on the stud 15, as the threaded knob, 16 is turned, the screw thread of knob 16 will force the knob 16 and the sliding lock 14 against the longitudinal support 2. Vertical tracking of the sun is accomplished by rotating the reflector assembly 1, 2, 3, 4, 5 to the desired angle and locking in place by tightening the knob 16 and sliding lock 14 against the longitudinal support 2.

The reflector assembly 1, 2, 3, 4, 5 may be easily removed from the leg assemblies 8, 9 by removing the knob 16 from the stud 15. Then grasping the leg assemblies 8, 9 at their apexes and slightly pulling and bending the apexes away from the perpendicular supports 4, 5 until the pin in hole 7 disengages from the hole 7 in the perpendicular support assemblies 4, 5. Then lifting the reflector assembly 1, 2, 3, 4, 5 up and away.

Figure 2:
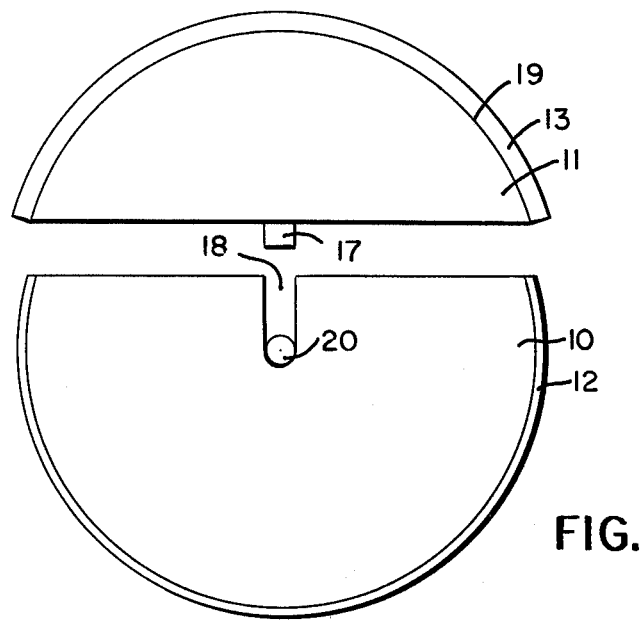
FIG. 2 is a side view of the cylindrical oven.
Figure 3:
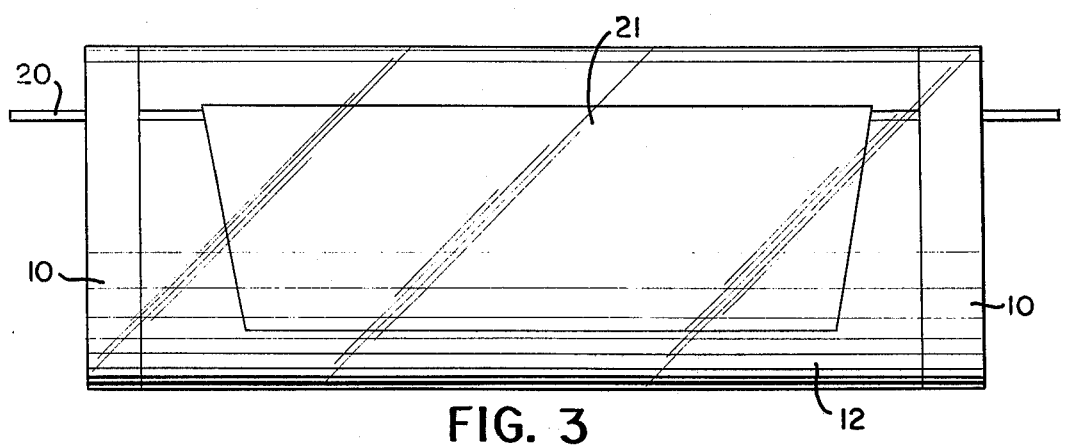
FIG. 3 is a front view of the cylindrical oven bottom, showing the skewer and suspended cooking pan inside the oven.

Referring to FIGS. 2 and 3, the oven assembly top 11, 13 is set on the oven assembly bottom 10, 12 and held in place by engaging a pin 17, secured to the end pieces 11, into slots 18 cut into the end pieces 10 of the oven bottom 10, 12. The oven assembly top 11, 13 has a reflective film or foil 19 glued to the inside of the oven top 11, 13 to rereflect any stray sun rays and heat. The slot 18 in the end pieces 10 also serve to hold a skewer 20 in place. The skewer 20 holds the item to be cooked on the focal line. If the food is not skewerable, such as liquids, the skewer 20 serves to suspend a cooking pan 21 inside the oven assembly 10, 11, 12, 13. As the pan 21 is suspended on the focal line, the reflector assembly 1, 2, 3, 4, 5 and the oven assembly 10, 11, 12, 13 may be moved to any angle to track the sun and the liquid contents of the pan 21 will not be spilled as the pan 21 will remain upright.

Figure 4:
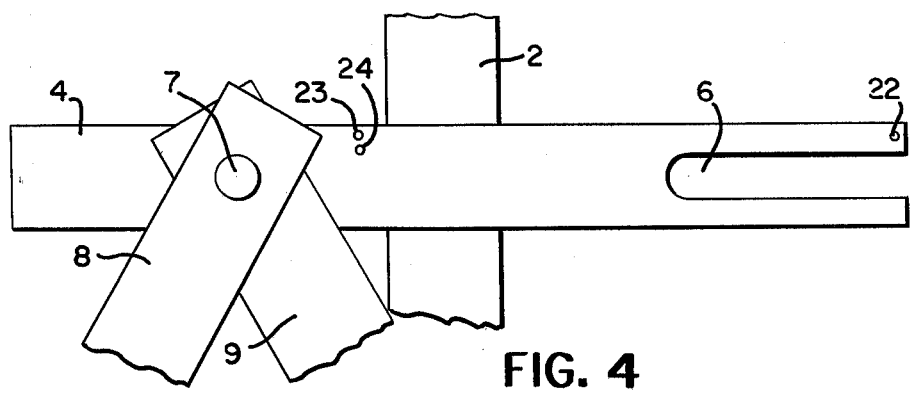
FIG. 4 is a side view of the cooker pivot point and aiming device.

Referring to FIG. 4, on the perpendicular support 4 a pin 22 is secured near the open end of the slot 6 and allowed to protrude from the perpendicular support 4 about ½ inch. At the opposite end of the perpendicular support 4, between the hole 7 and the longitudinal support 2, two pins 23, 24 are secured to the perpendicular support 4 and allowed to protrude from the perpendicular support 4 about ½ inch. Three pins 22, 23, 24 comprise the aiming device and is operated as follows, when the reflector assembly 1 and supports 2, 3, 4, 5 are moved to an angle such that the shadow of pin 22 falls between the shadows of pins 23, 24 as observed on the upper portion of leg assembly 9, the reflector assembly 1 is in focus.

What is claimed is as follows:

1. A solar cooker consisting of a parabolic reflector trough having ends supported by longitudinal supports, perpendicular supports connected to the center of the longitudinal supports, said perpendicular supports having folding leg assemblies, an aiming device and a cylindrical oven assembly attached thereto, and a sliding friction device attached between the longitudinal support and one leg in such a way as to allow the reflector assembly and oven assembly to almost balance each other around a pivot point in the perpendicular supports, near their collective center of gravity so the focus angle can be held with a camparatively light friction device and the solar cooker is not greatly affected by the wind.

2. A solar cooker described in claim 1 above, with support legs that will detach easily and fold for portability, by merely spreading the leg assemblies at their apex to disengage a pin from the hole in each side of the reflector and support assembly and pushing the unpinned ends of the leg assemblies together.

3. A solar cooker described in claim 1 above, with a cylindrical oven assembly made of transparent plastic to allow the sun's rays inside to the focal line of the cooker and prevent rereflection from the oven to the reflector and a reflective insulated oven cover to keep the solar heat inside.

4. A solar cooker described in claim 1 above, with a means for holding a skewer on the perpendicular support to hold food or to suspend a cooking pan inside the cylindrical oven and on the focal line so that when the focus angle is changed to track the sun, the suspended pan will pivot on the skewer so the contents of the pan will not spill.

5. A solar cooker described in claim 1 above, with an aiming device mounted on a perpendicular support, consisting of three pins, with one pin located at the top end of the support and two pins located at the bottom end of the support in such a way that the shadow of the one pin will fall on the support leg between the shadow of the two pins when the reflector assembly is in proper focus.

* * * * *